(12) United States Patent
Sim

(10) Patent No.: US 9,986,005 B2
(45) Date of Patent: May 29, 2018

(54) MEDIA PLAYBACK METHOD AND APPARATUS IN MULTIPLE MEDIA DEVICES

(71) Applicant: Samsung Electronics Co. Ltd., Suwon-si, Gyeonggi-do (KR)

(72) Inventor: Sang-Man Sim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 882 days.

(21) Appl. No.: 13/946,407

(22) Filed: Jul. 19, 2013

(65) Prior Publication Data

US 2014/0032778 A1 Jan. 30, 2014

(30) Foreign Application Priority Data

Jul. 24, 2012 (KR) .................. 10-2012-0080566

(51) Int. Cl.
*G06F 15/16* (2006.01)
*H04L 29/06* (2006.01)
*H04N 21/43* (2011.01)
*H04N 21/436* (2011.01)

(52) U.S. Cl.
CPC .......... *H04L 65/60* (2013.01); *H04L 65/4092* (2013.01); *H04L 65/80* (2013.01); *H04N 21/4307* (2013.01); *H04N 21/43615* (2013.01)

(58) Field of Classification Search
CPC ..... H04L 65/60; H04L 65/4092; H04L 65/80; H04N 21/4307; H04N 21/43615; H04N 21/482; H04N 21/8173; H04N 2201/3273

USPC ......................................... 709/232
See application file for complete search history.

(56) References Cited

U.S. PATENT DOCUMENTS

| 8,468,070 | B1 * | 6/2013 | Scofield ................. G06Q 30/04 705/34 |
| 2008/0037674 | A1 * | 2/2008 | Zurek ............... H04L 29/06027 375/262 |
| 2010/0057860 | A1 * | 3/2010 | Fry ..................... H04L 12/1895 709/206 |

(Continued)

FOREIGN PATENT DOCUMENTS

| JP | 2011-114681 A | 6/2011 |
| KR | 10-2003-0070932 A | 9/2003 |

(Continued)

*Primary Examiner* — Hitesh Patel
(74) *Attorney, Agent, or Firm* — Jefferson IP Law, LLP

(57) ABSTRACT

A media playback method and apparatus, and a recording medium for storing program sources of the method, and the media playback method of playing media in a media device in sync with at least one other media device are provided. The method includes determining a media playback time based on a communication delay time with each of other media devices with which a communication channel is established, generating a media playback command message for each of the other media devices based on the determined media playback time and the communication delay time with each of the other media devices, transmitting the media playback command message to the other corresponding media device, and performing media playback at the media playback time. The present invention has an advantage of playing back the same media in multiple media devices, synchronously.

12 Claims, 9 Drawing Sheets

(56) References Cited

U.S. PATENT DOCUMENTS

| | | | | |
|---|---|---|---|---|
| 2010/0111491 A1* | 5/2010 | Kamoto | ............... | G06F 3/1446 |
| | | | | 386/207 |
| 2012/0081302 A1* | 4/2012 | Gimpl | ................. | G06F 1/1616 |
| | | | | 345/173 |
| 2012/0144435 A1* | 6/2012 | Spilo | ....................... | H04N 5/76 |
| | | | | 725/78 |
| 2012/0207215 A1* | 8/2012 | Ryu | ............... | G11B 20/10527 |
| | | | | 375/240.12 |
| 2015/0296269 A1* | 10/2015 | Tokumo | ............. | H04N 21/238 |
| | | | | 725/93 |

FOREIGN PATENT DOCUMENTS

| | | |
|---|---|---|
| KR | 10-2005-0049820 A | 5/2005 |
| KR | 10-2005-0074020 A | 7/2005 |
| KR | 10-2007-0006182 A | 1/2007 |
| KR | 10-2011-0007668 A | 1/2011 |

\* cited by examiner

|  | MASTER MEDIA DEVICE | Device A | Device B |
|---|---|---|---|
| TRANSMISSION TIME OF MEASUREMENT MESSAGE AT MASTER MEDIA DEVICE | 12:00:00 | - | - |
| RECEPTION TIME OF MEASUREMENT REPLY MESSAGE FOR MEASUREMENT MESSAGE AT MASTER MEDIA DEVICE | - | 12:00:02 | 12:00:06 |
| COMMUNICATION DELAY TIME | - | 1 SECOND | 3 SECONDS |
| PRESENT TIME OF EACH MEDIA DEVICE INCLUDED IN MEASUREMENT REPLY MESSAGE | - | 12:01:01 | 12:02:03 |
| TIME DIFFERENCE WITH EACH MEDIA DEVICE | - | 1 MINUTE | 2 MINUTES |
| PRESENT TIME | 12:00:06 | 12:01:06 | 12:02:06 |
| MEDIA PLAYBACK TIME | 12:00:09 | 12:01:09 | 12:02:09 |

FIG.8A

| Header | Reproduction | Media A | 12:01:09 |
|---|---|---|---|

FIG.8B

| Header | Reproduction | Media B | 12:02:09 |
|---|---|---|---|

MEDIA PLAYBACK METHOD AND APPARATUS IN MULTIPLE MEDIA DEVICES

PRIORITY

This application claims the benefit under 35 U.S.C. § 119(a) of a Korean patent application field on Jul. 24, 2012 in the Korean Intellectual Property Office, and assigned Serial No. 10-2012-0080566, the entire disclosure of which is hereby incorporated by reference.

BACKGROUND OF THE INVENTION

1. Field of the Invention

The present invention relates generally to a media playback method and apparatus, and a recording medium for storing a program relating to the method. More particularly, the present invention relates to a method and apparatus for playing back media in multiple media devices, and a recording medium for storing a program relating to the method.

2. Description of the Related Art

With the development of information and telecommunication technologies, the use of various media devices, such as smartphones, has recently increased. The media devices are equipped with a wireless communication module for data exchange between users or for data reception from a particular service server.

The media devices are also equipped with various functionalities as a result of the increased popularity of applications by universal software platforms, and among others, applications for media reproduction (e.g., reproduction of music, video, and the like).

In addition, user demand for simultaneous media playback in multiple media devices has also increased. For example, many users want to experience surround effects by separating sound channels of a music file having many sound channels and playing the sound channels back using different media devices.

To achieve this, the related art includes a method of implementing the surround effect by separating and assigning sound channels of the music file to multiple multimedia devices and playing the sound channels back using different multimedia devices. However, in the method according to the related art, because a communication delay time between media devices is not taken into account, media devices reproduce different media parts at a point in time. This reduces the quality of user experience significantly.

Therefore, a need exists for a system and method for playing back the same media synchronously in multiple media devices taking into account communication delay time between media devices.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a way of playing back the same media synchronously in multiple media devices taking into account communication delay time between media devices.

In accordance with an aspect of the present invention, a media playback method of playing media in a media device in sync with at least one other media device is provided. The method includes determining a media playback time based on a communication delay time with each of other media devices with which a communication channel is established, generating a media playback command message for each of the other media devices based on the determined media playback time and the communication delay time with the corresponding media device, transmitting the media playback command message to each of the other media devices, and performing media playback at the media playback time.

In accordance with another aspect of the present invention, a media playback method of playing media in a media device in sync with another media device is provided. The method includes receiving a media playback command message from the another media device, determining a media playback time by analyzing the media playback command message, and performing media playback at the media playback time.

In accordance with another aspect of the present invention, a media playback apparatus for playing media in a media device in sync with at least one other media devices is provided. The apparatus includes a communication unit for communicating with other media devices, and a controller for determining a media playback time based on a communication delay time with each of the other media devices with which a communication channel is established, for generating a media playback command message for each of the other media devices based on the determined media playback time and the communication delay time with the corresponding media devices, for operatively transmitting the media playback command message through the communication unit, and for performing media playback at the media playback time.

In accordance with another aspect of the present invention, a media playback apparatus for playing media in a media device in sync with another media device is provided. The apparatus includes a communication unit for communicating with other media devices, and a controller for determining a media playback time by analyzing a media playback command message received from one of the other media devices through the communication unit, and for performing media playback at the determined media playback time.

In accordance with another aspect of the present invention, a non-transitory computer-readable recording medium for carrying out a media playback method is provided. The method includes determining a media playback time based on a communication delay time with each of other media devices with which a communication channel is established, generating a media playback command message for each of the other media devices based on the determined media playback time and the communication delay time with the corresponding media device, transmitting the media playback command message to the other media devices; and performing media playback at the media playback time.

In accordance with another aspect of the present invention, a non-transitory computer-readable recording medium for carrying out a media playback method is provided. The method includes receiving a media playback command message from the another media device, determining a media playback time by analyzing the media playback command message, and performing media playback at the media playback time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 8A to 8C illustrate media playback command messages, according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
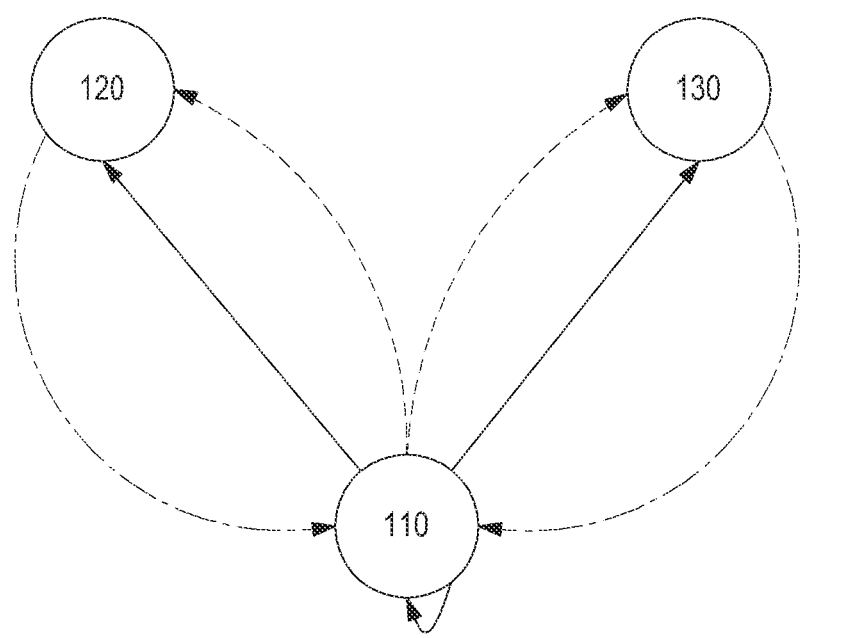
FIG. 1 illustrates a conceptual diagram of a media playback method, according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Descriptions of some well-known technologies that possibly obscure exemplary embodiments of the present invention will be omitted, if necessary.

As described above in relation to the background of exemplary embodiments of the present invention, the media playback method according to the related art has not taken into account wireless communication environments. Consequently, the media playback method according to the related art fails to synchronously play back the same media in multiple media devices.

Thus, exemplary embodiments of the present invention herein propose a method for synchronously playing back the same media in multiple devices. Specifically, in an exemplary embodiment of the present invention, a media device measures a communication delay time with another media device, and enables media control to be performed at a media control time determined by taking into account the measured communication delay time. Thus, exemplary embodiments of the present invention provide an advantage of improving the quality of experience of a user who controls media, by eliminating a difference in media control time between media devices in a wireless communication environment.

In the following exemplary embodiments of the present invention, media devices are assumed to be equipped with a wireless communication module that enables wireless communication with other media devices.

The media devices refer to devices for recording and playing back media, including cell phones, smartphones, tablets, Global Positioning System (GPS) devices, Personal Digital Assistants (PDAs), Portable Multimedia Players (PMPs), Moving Picture Experts Group layer 3 (MP3) players, netbooks, desktop computers, notebook computers, communication terminals able to connect to the Internet, communication terminals able to receive broadcast signals, and the like.

In the following exemplary embodiments of the present invention, the term 'media' refers to various content, such as text, audio, images, animations, videos, and the like.

For convenience of explanation, a media device that receives from a user different information for media control and that generates various messages for controlling another media device is referred to as a master media device, and a device that receives from the master media device various messages and performs media control is referred to as a slave media device.

FIG. 1 illustrates a conceptual diagram of a media playback method according to an embodiment of the present invention.

Referring to FIG. 1, for convenience of explanation, a master media device 110 and two slave media devices 120 and 130 are illustrated. However, exemplary embodiments of the present invention may use more or less slave media devices. Assume that a communication channel is established between the master media device 110 and each of the slave media devices 120 and 130 for data transmission. The communication channel may be established by means of various communication systems, such as Code Division Multiple Access (CDMA), Wideband Code Division Multiple Access (WCDMA), Long Term Evolution (LTE), Wireless Broadband (WiBro), WiFi, WiFi direct, Bluetooth, Infrared Data Association (IrDA), and the like.

For simultaneous media playback with the slave media devices 120 and 130, the master media device 110 measures communication delay times with the slave media devices 120 and 130. To do this, the master media device 110 transmits a message to each of the slave media devices 120 and 130 for measuring the communication delay time. The master media device 110 measures the communication delay time by analyzing a reply message received from each of the slave media devices 120 and 130.

The master media device 110 then determines when to play media (e.g., a media playback time) based on the measured communication delay time. According to an exemplary embodiment of the present invention, the determination of the media playback time may be made based on the longest one of communication delay times with the slave media devices 120 and 130.

The master media device 100 then generates a media playback command message to be transmitted to each of the slave media devices 120 and 130 based on the determined media playback time and the communication delay time with each of the slave media devices 120 and 130, and transmits the media playback command message to the corresponding slave media device.

When the determined media playback time comes, the master media device 110 performs media playback. Each of the slave media devices 120 and 130 also performs the media playback in sync with the media playback at the master media device 110, based on a result of analysis of the received media playback command message.

According to the exemplary embodiments of the present invention, multiple media devices may synchronously play the same media.

The concept of the media playback method according to an exemplary embodiment of the present invention has been described above with reference to FIG. 1. The media playback method according to an exemplary embodiment of the present invention will now be described in more detail with reference to related figures.

Figure 2:
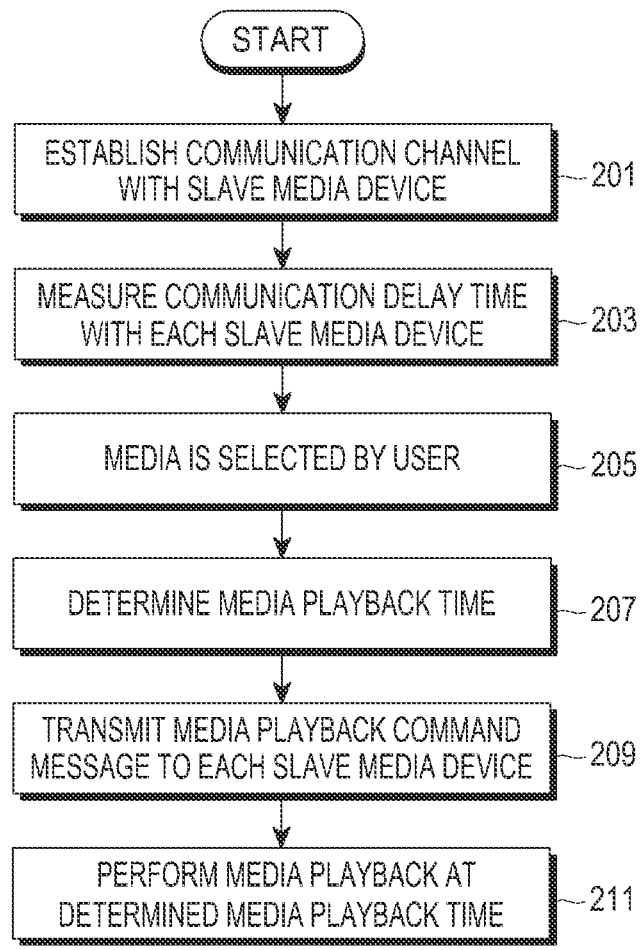
FIG. 2 is a flowchart of a media playback method in terms of a master media device, according to an exemplary embodiment of the present invention.

FIG. 2 is a flowchart of a media playback method in terms of a master media device, according to an exemplary embodiment of the present invention.

Referring to FIG. 2, in the flowchart, operations are performed by the master media device 110.

In step 201, the master media device 110 establishes a communication channel with at least one of the slave media devices 120 and 130, and proceeds to step 203. Establishing the communication channel with the slave media device 120 or 130 may correspond to establishing a connection with the slave media device 120 or 130 for transmitting and/or receiving various messages and data.

According to exemplary embodiments of the present invention, to establish the communication channel with the slave media device 120 or 130, the master media device 110 transmits a message of requesting the at least one slave media device 120 or 130 selected by the user for establishment of the communication channel. In return, the master media device 110 receives from the slave media device 120 or 130 a message of acceptance or denial of the establishment of the communication channel. Upon reception of the message of acceptance of the establishment of the communication channel, the master media device 110 proceeds to step 203.

In step 203, the master media device 110 measures communication delay times with the slave media devices with which the master media device 110 establishes communication channels, and proceeds to step 205.

According to exemplary embodiments of the present invention, to measure communication delay times with the slave media devices with which the master media device 110 has established a communication channel, the master media device 110 transmits a measurement message of measuring the communication delay times to the slave media devices 120 and 130 with which the communication channel is established. In return, the master media device 110 receives from the slave media devices 120 and 130 reply messages for the measurement message. Based on the transmission time of the measurement message and a reception time of the reply message, the master media device 110 determines the communication delay time with each of the slave media devices 120 and 130. For example, the master media device 110 may determine half the difference in time between the transmission of the measurement message and the reception of the reply message to be the communication delay time with the corresponding slave media device. The measurement message may include address information of the slave media device, identification information corresponding to the master media device 110, and information about the measurement message.

The transmission of the measurement message and the reception of the reply message may be repeated multiple times, and thus the master media device may alternatively calculate the average delay time over the multiple times as the communication delay time with each slave media device 120 or 130 by taking into account the frequency of the transmission of the measurement message.

In step 205, the master media device 110 allows a user to select media to be played, and proceeds to step 207.

In step 207, the master media device 110 determines the media playback time based on the measured communication delay time, and proceeds to step 209. For example, in the case when the master media device 110 establishes communication channels with two slave media devices 120 and 130, the master media device 110 determines the media playback time based on the longest communication delay time with one of the two slave media devices 120 and 130. Specifically, for example, the master media device 110 determines to play the media at a time after passage of the longest communication delay time with one of the slave media devices from the present point in time.

In step 209, the master media device 110 generates and transmits a media playback command message to each slave media device, and proceeds to step 211. Herein, the media playback command message is generated based on the communication delay time with each slave media device and the determined media playback time. The media playback command message will be described later with reference to related drawings.

In step 211, the master media device plays the media at the media playback time determined in step 207.

In the foregoing, operations of the master media device 110 according to an exemplary embodiment of the present invention were described with reference to FIG. 2. Now, operations of the slave media device according to an exemplary embodiment of the present invention will be described with reference to FIG. 3.

Figure 3:
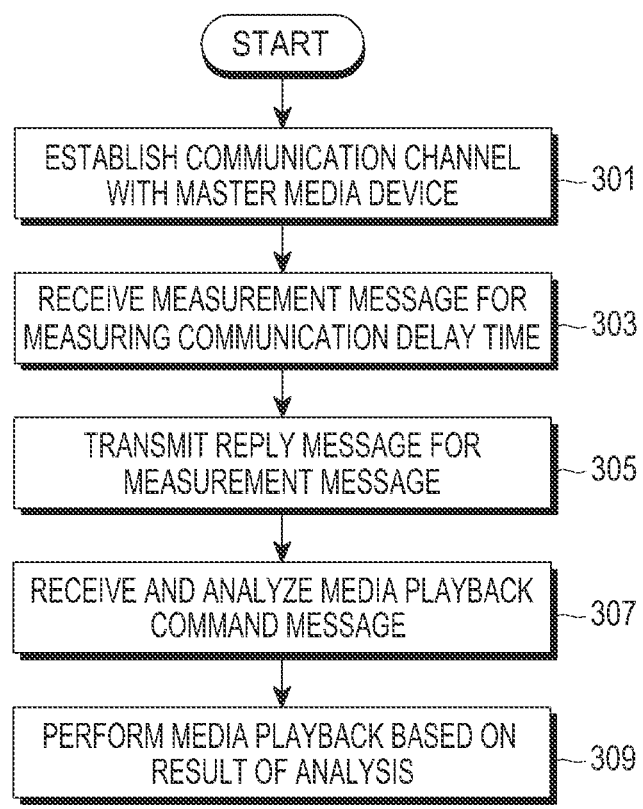
FIG. 3 is a flowchart of a media playback method in terms of a slave media device, according to an exemplary embodiment of the present invention.

FIG. 3 is a flowchart of a media playback method in terms of a slave media device, according to an exemplary embodiment of the present invention.

Referring to FIG. 3, in the flowchart, operations are performed by the slave media device 120 or 130.

In step 301, the slave media device 120 or 130 establishes a communication channel with the master media device 110, and proceeds to step 303. The communication channel may be established when the slave media device 120 or 130 transmits an acceptance message in response to the request of the master media device 110 to establish the communication channel.

Upon reception of the measurement message from the master media device 110 for measuring the communication delay time in step 303, the slave media device 120 or 130 transmits a reply message for the measurement message to the master media device 110 in step 305 and proceeds to step 307.

According to exemplary embodiments of the present invention, the reply message may include address information of the master media device 110, identification information corresponding to the slave media device 120 or 130, and information about the reply message.

Upon reception of the media playback command message from the master media device 110, the slave media device 120 or 130 analyzes the media playback command message, in step 307, and proceeds to step 309.

In step 309, the slave media device performs media playback based on a result of analysis of the media playback command message.

In the foregoing, the media playback method according to an exemplary embodiment of the present invention was described with reference to FIG. 2.

According to the exemplary embodiments of the present invention described with reference to FIGS. 2 and 3, it is assumed that the master media device 110 and each of the slave media devices 120 and 130 operate synchronously. If the master media device 110 and each of the slave media devices 120 and 130 operate asynchronously, present time of each media devices may be taken into account in generating the media playback command message.

Furthermore, in the foregoing exemplary embodiments of the present invention described with reference FIGS. 2 and 3, it is assumed that the media to be played is stored in all of the media devices beforehand. If there is a media device that does not store the media to be played, the media needs to be transmitted to the media device.

Taking the foregoing considerations into account, exemplary embodiments of the present invention will be described below with reference to related drawings. These exemplary embodiments of the present invention may be combined with the exemplary embodiments of the present invention described with reference to FIGS. 2 and 3. According to exemplary embodiments of the present invention, some steps may be omitted.

Figure 4:
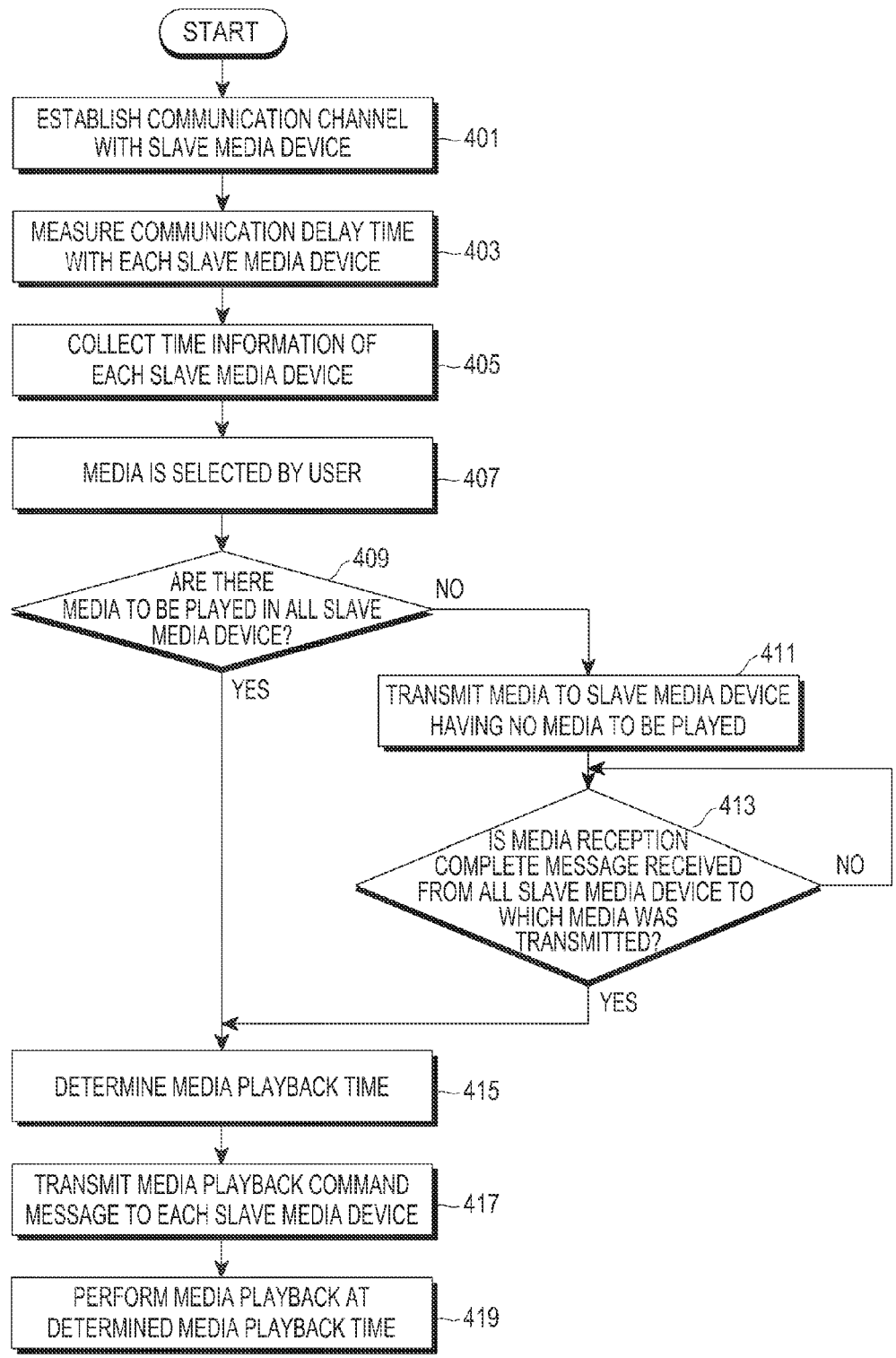
FIG. 4 is a flowchart of a media playback method in terms of a master media device, according to an exemplary embodiment of the present invention.

FIG. 4 is a flowchart of a media playback method, according to an exemplary embodiment of the present invention.

Referring to FIG. 4, in the flowchart, operations are performed by the master media device 110.

In step 401, the master media device 110 establishes a communication channel with at least one slave media device, and proceeds to step 403. Detailed description of step 401 is omitted because the description in relation to step 201 of FIG. 2 provides a description of the master media device 110 establishing a communication channel with at least one slave media device.

In step 403, the master media device 110 measures the communication delay time with each of the slave media devices 120 and 130, and proceeds to step 405. To do this, the master media device 110 transmits a measurement message for measuring the communication delay time to each of the slave media devices 120 and 130. The measurement message to be transmitted to the slave media device 120 or 130 for measuring the communication delay time is to request the slave media device 120 or 130 for the present time of the slave media device 120 or 130, and the reply message received from the slave media device 120 or 130 includes the present time of the slave media device 120 or 130.

In step 405, the master media device 110 collects time information from each of the slave media devices 120 and 130, and proceeds to step 407. The time information of each of the slave media devices 120 and 130 may be obtained by analyzing the reply message received in step 403.

In step 407, the master media device 110 allows the user to select media to be played, and proceeds to step 409. In this regard, the master media device 110 displays stored media on a display area for the user to select the media. If any of the media is selected by the user, the method proceeds to step 409.

In step 409, the master media device 110 determines if the media to be played (e.g., the media selected by the user in step 407) is stored in the slave media device with which the communication channel is established. In this regard, the master media device 110 transmits to the slave media device 120 or 130 a message of asking the slave media device 120 or 130 if the slave media device 120 or 130 stores the media selected by the user. The message of asking whether the media is stored may include address information of the slave media device, identification information corresponding to the master media device 110, and an inquiry as to whether the media is stored in the slave media device 120 or 130.

The master media device 110 analyzes the reply message received from each of the slave media devices 120 and 130. If the master media device 110 determines that the selected media is to be stored in all of the slave media devices 120 and 130, the master media device 110 proceeds to step 415. Conversely, if the master media device 110 determines that the selected media is not stored in any of the slave media devices 120 and 130, the master media device 110 proceeds to step 411. The reply message may include address information of the master media device 110, identification information corresponding to the slave media device, and information that indicates whether or not the media is stored in the corresponding slave media device.

In step 411, the master media device 110 transmits the media to be played to the corresponding slave media device, and proceeds to step 413.

In step 413, the master media device 110 determines whether a media reception complete message indicating that the media has been completely received is received from all of the slave media devices 120 and 130. The media reception complete message may include address information of the master media device 110, identification information corresponding to the slave media device, and information indicating that the media reception has been successfully completed. If there is any slave media device that has not transmitted the media reception complete message, the master media device 110 may transmit a reconfirmation message requesting confirmation that the corresponding slave media device has received the media. If any slave media device 120 or 130 transmits a message indicating that the slave media device has failed to receive the media, the master media device 110 may re-transmit the media to the corresponding slave media device. Otherwise, if all of the slave media devices to which the media was transmitted transmit the media reception complete messages, the master media device 110 proceeds to step 415.

Detailed descriptions of steps 415 to 419 are omitted because the description in relation to steps 207 to 211 of FIG. 2 provides a description of similar steps.

In the foregoing operations of the master media device according to an exemplary embodiment of the present invention was described with reference to FIG. 4. Now, operations of the slave media device according to an exemplary embodiment of the present invention will be described with reference to FIG. 5.

Figure 5:
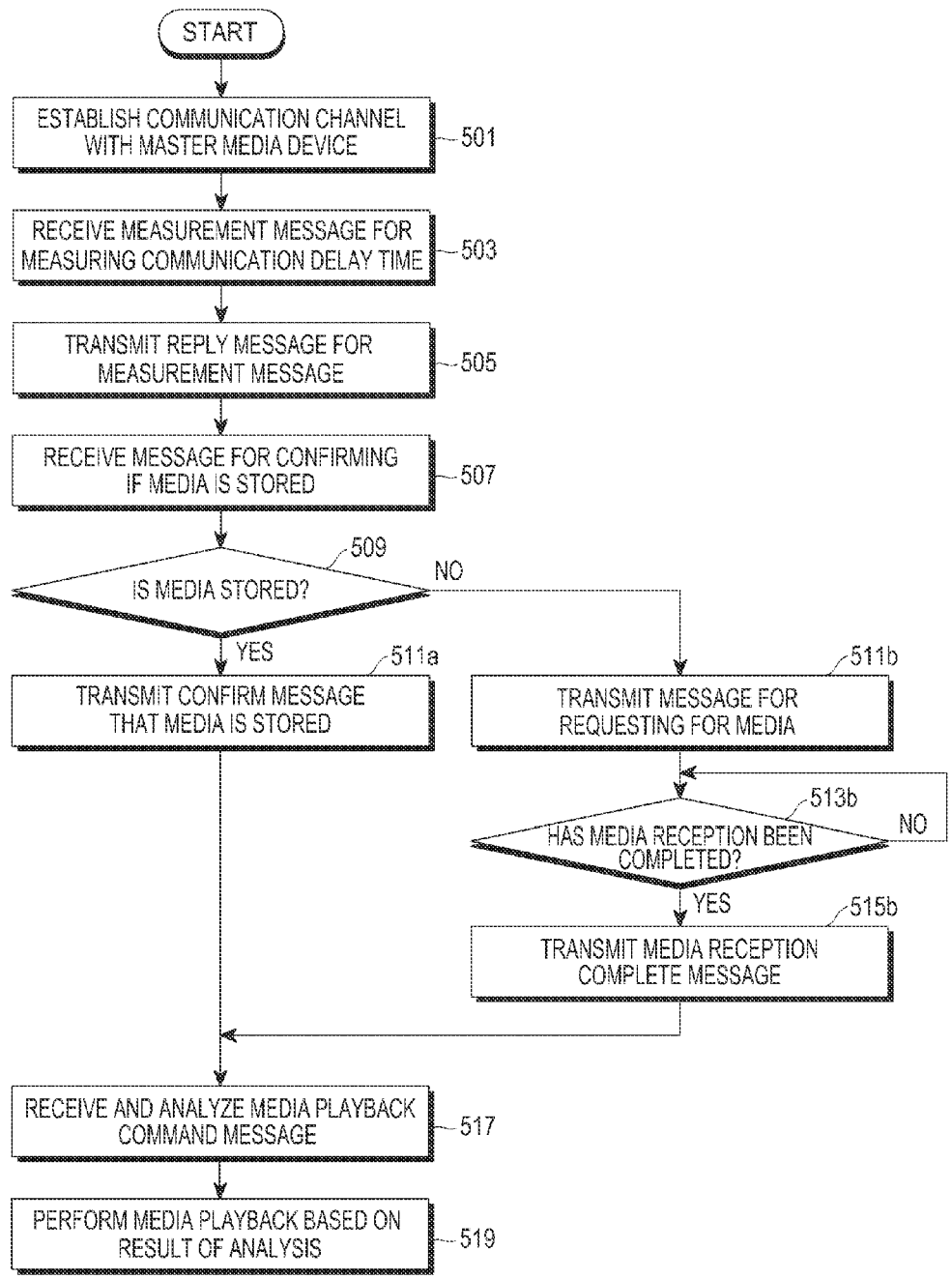
FIG. 5 is a flowchart of a media playback method in terms of a slave media device, according to an exemplary embodiment of the present invention.

FIG. 5 is a flowchart of a media playback method, according to an exemplary embodiment of the present invention.

Referring to FIG. 5, in the flowchart, operations are performed by the slave media device 120 or 130 of FIG. 1.

In step 501, the slave media device 120 or 130 establishes a communication channel with the master media device 110, and proceeds to step 503.

In step 503, the slave media device 120 or 130 receives from the master media device 110 a measurement message for measuring the communication delay time, and proceeds to step 505. The measurement message for measuring the communication delay time is to request the slave media device 120 or 130 for the present time of the slave media device 120 or 130 (e.g., the present time of the slave media device 120 or 130) when the slave media device 120 or 130 receives the measurement message.

In step 505, the slave media device transmits a reply message for the measurement message to the master media device, and proceeds to step 507. The reply message indicates the present time of the slave media device 120 or 130 when the slave media device 120 or 130 received the measurement message.

In step 507, the slave media device 120 or 130 receives from the master media device 110 a message of inquiring whether the media to be played is stored, and proceeds to step 509.

In step 509, the slave media device 120 or 130 determines whether the media is stored. If the slave media device 120 or 130 determines that the media is stored, then the slave media device 120 or 130 proceeds to step 511a. In contrast, if the slave media device 120 or 130 determines that the media is not stored, the slave media device 120 or 130 proceeds to step 511b.

In step 511a, the slave media device 120 or 130 transmits a message of indicating that the media is stored to the master media device 110, and proceeds to step 517.

In step 511b, the slave media device 120 or 130 transmits a message of requesting to transmit the media to the master media device 110, and proceeds to step 513b.

In step 513b, the slave media device 120 or 130 determines whether the media has been completely received from the master media device 110. If the slave media device 120 or 130 determines that the media has been completely received from the master media device 110, the slave media device 120 or 130 proceeds to step 515b. In contrast, if the slave media device 120 or 130 determines that the media device has not been completely received from the master media device 110, then the slave media device 120 or 130 continues to poll for complete reception of the media.

In step 515b, the slave media device 120 or 130 transmits a message indicating that the media reception has been completed to the master media device 110, and proceeds to step 517.

In step 517, the slave media device 120 or 130 receives from the master media device 110 the media playback command message and analyzes the media playback command message, and proceeds to step 519.

In step 519, the slave media device plays the media based on a result of the analysis of the media playback command message.

In the foregoing, the media playback method in terms of the slave media device according to an exemplary embodiment of the present invention was described with reference to FIG. 5. A structure of the media playback command message for transmission, according to an exemplary embodiment of the present invention will now be described with reference to related drawings.

Figure 6A:
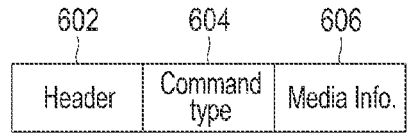
FIGS. 6A and 6B illustrate structures of a media playback command message, according to an exemplary embodiment of the present invention.
Figure 6B:
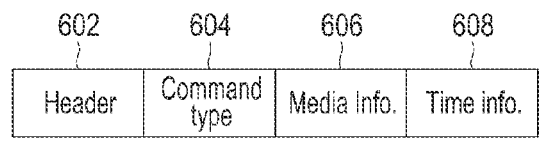

FIGS. 6A and 6B illustrate structures of a media playback command message, according to an exemplary embodiment of the present invention.

Referring to FIGS. 6A and 6B, FIG. 6A illustrates an example of a media playback command message when time information is included in the media playback command message, and FIG. 6B illustrates an example of a media playback command message when time information is not included in the media playback command message.

According to the exemplary embodiments of the present invention illustrated in FIGS. 6A and 6B, the media playback command messages include a header 602, a command type 604, and media information 606 in common. The header 602 includes information about a destination of the message on the established communication channel. The command type 604 includes information about what operation is to be performed. The media information 606 includes identification information for identifying the media to be played.

According to an exemplary embodiment of the present invention, the slave media device may play the media as soon as the media playback command message is received, or may play the media a predetermined time after the media playback command message is received.

When the slave media device is enabled to play the media as soon as the media playback command message is received, the master media device may transmit to the slave media device the media playback command message which does not include time information (e.g., the media playback command message illustrated in FIG. 6A). Thereafter, the slave media device analyzes the received media playback command message and if the slave media device determines that the media playback command message does not include time information, the slave media device performs the media playback immediately. According to an exemplary embodiment of the present invention, padding the time information with zeros may enable to play back the media as soon as the media playback command message is received.

In contrast, in order for the media to be played a predetermined time after the media playback command message is received, the master media device transmits the media playback command message to the slave media device by inserting the time information 608 into the media playback command message. Upon reception of the media playback command message, the slave media device analyzes the media playback command message to extract the time information 608, and plays the media after passage of a time indicated by the time information 608.

According to an exemplary embodiment of the present invention, the master media device may also insert absolute time information about when to play the media at the slave media device into the time information 608. Upon reception of the media playback command message, the slave media device analyzes the media playback command message to extract the time information 608, and plays the media at a time indicated by the time information 608. According to exemplary embodiments of the present invention, the master media device and the corresponding slave media device may perform a synchronization of their respective absolute clocks or other timing mechanism (e.g., which provide for determination of an absolute time).

In the foregoing, the structure of the media playback command message according to an exemplary embodiment of the present invention was described with reference to FIGS. 6A to 6B. The media playback command message arranged based on the measured communication delay time will be described below with reference to related drawings.

Figure 7A:
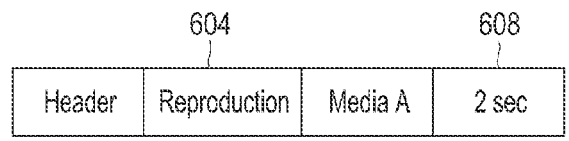
FIGS. 7A to 7C illustrate media playback command messages, according to an exemplary embodiment of the present invention.
Figure 7B:
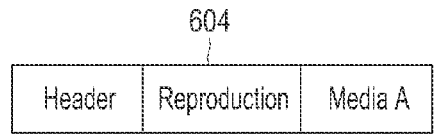
Figure 7C:
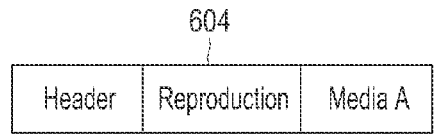

FIGS. 7A to 7C illustrate media playback command messages to be transmitted to the slave media device, according to an exemplary embodiment of the present invention.

Referring to FIGS. 7A to 7C, an exemplary embodiment of the present invention is described using an example in which the master media device establishes communication channels with two slave media devices A and B.

After establishment of the communication channels with the slave media devices A and B, the master media device measures communication delay times with the slave media devices A and B. As shown in FIG. 7A, an exemplary embodiment of the present invention is described using an example in which the communication delay times with the slave media devices A and B are measured to be 1 and 3 seconds, respectively.

The master media device then determines when to play media (e.g., the media playback time) based on the measured communication delay times. As described above, the media playback time may be determined based on longest one of the communication delay times with the slave media devices A and B. Thus, the master media device determines the media playback time based on 3 seconds of communication delay time with the slave media device B. For example, as shown in FIG. 7A, the media playback time is determined to be 3 seconds later from the present time.

Media playback will now be examined in connection with the slave media device A. Because the communication delay time with the slave media device A is 1 second but the determined media playback time is 3 seconds later, the master media device transmits the media playback command message to the slave media device A by inserting time information 608 corresponding to 2 seconds into the media playback command message in order for the slave media device A to play the media 2 seconds after receiving the media playback command message. In FIG. 7B, the command type 604 of the media playback command message is 'reproduction' (e.g., a command to play the media). According to an alternative exemplary embodiment of the present invention, instead of the slave media device waiting for 2 seconds after receiving the media playback command message until playing the media, the master media device may wait for 2 seconds and generate and transmit the media playback command message without the time information, or may wait for 2 seconds after generating the media playback command message and transmit the media playback command message to the slave media device.

Media playback will now be examined in connection with the slave media device B. Because the communication delay time with the slave media device B is 3 seconds and the determined media playback time is 3 seconds later, the master media device 110 transmits the media playback command message to the slave media device B without inserting time information 608 into the media playback command message in order for the slave media device B to play the media as soon as the slave media device B receives the media playback command message. Alternatively, according to exemplary embodiments of the present invention, time information of 0 seconds may be inserted into the media playback command message.

The master media device performs the media playback at the determined media playback time (e.g., 3 seconds after completion of measurement of the communication delay time).

As described with reference to FIGS. 4 and 5, the master media device measures the present times of the slave media devices A and B, and configures the media playback command messages based on the measured present times of the slave media devices A and B. The configuration of the media playback command messages based on the measured present times of the slave media devices A and B will be described with reference to FIG. 8.

FIGS. 8A to 8C illustrate media playback command messages, according to an exemplary embodiment of the present invention.

Referring to FIGS. 8A to 8C, an example of an exemplary embodiments of the present invention is described using an example in which the master media device transmits to the slave media devices A and B the measurement message to measure the communication delay times at 12 (hour):00 (minute):00 (second), and receives reply messages for the measurement message from the slave media devices A and B at 12:00:02 and 12:00:06, respectively. Assuming that bi-directional communication delays are the same, the communication delay times with the slave media devices A and B are measured to be 1 and 3 seconds, respectively.

Meanwhile, the present times included in the reply messages received from the slave media devices A and B are assumed to be 12:01:01 and 12:02:03, respectively. A difference in the present time between the master media device and each of the slave media devices may be calculated by subtracting each of the communication delay times from the present time of each of the slave media devices A and B. Thus, in this case, the difference in the present time between the master media device and the slave media device A is 1 minute, and the difference in the present time between the master media device and the slave media device B is 2 minutes.

Therefore, upon completion of reception of the reply messages from the both slave media devices A and B, the present times of the master media device, and the slave media devices A and B are 12:00:06, 12:01:06, 12:02:06, respectively.

The media playback time is determined based on the longest communication delay time. Thus, the media playback time is determined 3 seconds later from the present time, which is 12:00:09 for the master media device; 12:01:09 for the slave media device A; and 12:02:09 for the slave media device B.

The master media device generates a media playback command message having such time information inserted and transmits the media playback command message to the corresponding slave media device. FIG. 8B illustrates the media playback command message transmitted to the slave media device A, and FIG. 8C illustrates the media playback command message transmitted to the slave media device B. Because the slave media device B may receive the media playback command message at 12:02:09 and the time information inserted therein also indicates 12:02:09, there is no need to insert such time information into the media playback command message to be transmitted to the slave media device B. Then, upon reception of the media playback command message without the time information, the slave media device B performs the media playback immediately after receiving the media playback command message.

The master media device performs the media playback at its media playback time (e.g., 12:00:09).

According to the exemplary embodiment of the present invention described in connection with FIG. 8, the master media device stores and maintains the communication delay times measured for the slave media devices A and B with which the master media device has established communication channels, and differences in present times between the master media device and the slave media devices. Afterwards, using the stored information, the master media device generates a media control command message to be used for media playback control, such as pausing or replying, sound control, such as volume up/down or output sound channel change, and image control, such as image splitting, and transmits the media control command message to the corresponding slave media device.

According to exemplary embodiments of the present invention, the media control command message has the same structure as that of the media playback command message shown in FIG. 6, in which herein the command type 604 has information relating to a control command.

Figure 9:
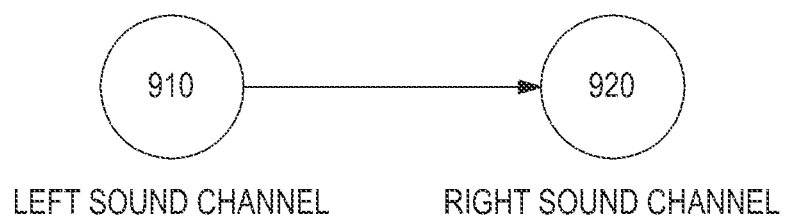
FIG. 9 illustrates a diagram for explaining separation of sound channels for output according to an exemplary embodiment of the present invention.
Figure 10:
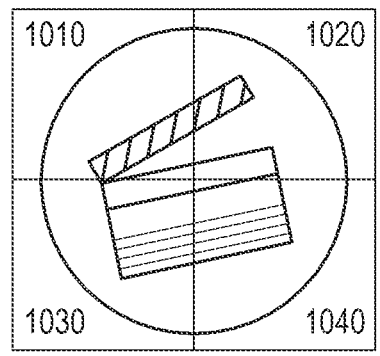
FIG. 10 illustrates a diagram for explaining outputting of split-screens according to an exemplary embodiment of the present invention.

FIG. 9 illustrates a diagram for explaining separation of sound channels for output according to an exemplary embodiment of the present invention. FIG. 10 illustrates a diagram for explaining outputting of split-screens according to an exemplary embodiment of the present invention.

Referring to FIG. 9, according to exemplary embodiments of the present invention, in playing back a sound file having at least two sound channels, a separate sound channel may be assigned to each media device. For example, as shown in FIG. 9, assuming that a media playback system includes the master media device 910 and a single slave media device 920, the master media device 910 plays the left channel of a stereo sound channel while the slave media device 920 plays the right channel of the stereo sound channel. In this case, the media playback command message, as described above in connection with FIG. 6, may further include channel information about which channel sound the slave media device needs to play.

Referring to FIG. 10, in contrast to the example illustrated in FIG. 9, in playing back an image file, the image file may be screen-split, which may be reproduced with at least one slave media device. For this, the master media device allows the user to select the number of screens into which an image file is split and media devices to reproduce the split screens. For example, as shown in FIG. 10, the upper left split-screen is determined to be reproduced by the master media device 1010, the upper right split-screen by a slave media device 1020, the bottom left split-screen by a slave media device 1030, and the bottom right split-screen by a slave media device 1040. In this case, the media playback command message, as described in connection with FIG. 6, may further include the split-screen information to be reproduced by the slave media device (e.g., information about which part of the displayed screen of the image file is to be reproduced by the slave media device).

Conversely, in reproducing texts, animation effects may be derived by differentiating the media playback time at different media devices.

Figure 11:
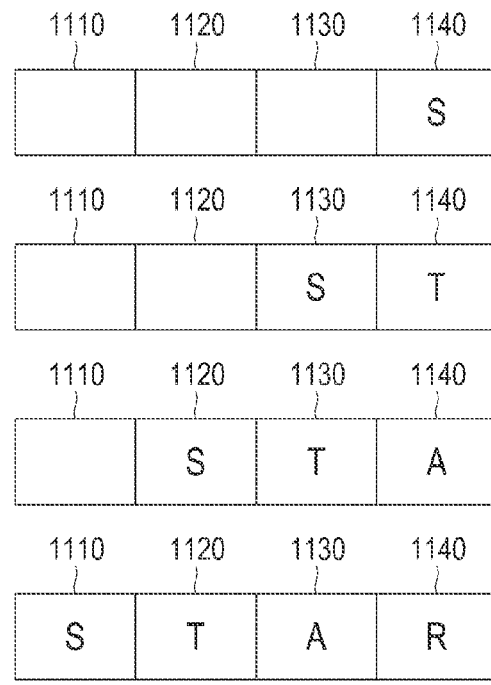
FIG. 11 illustrates a diagram for explaining an animation effect according to an exemplary embodiment of the present invention.

FIG. 11 illustrates a diagram for explaining an animation effect according to an exemplary embodiment of the present invention.

Referring to FIG. 11, when a user selects a word 'STAR' and information about a difference in starting time of media playback, e.g., a sequence of media devices to reproduce the word and a reproduction gap between the letters, the master media device may generate a media playback command message taking into account the sequence of media devices to reproduce the word and the reproduction gap, and transmits the media playback command message to each slave media device. FIG. 11 illustrates an example in which the animation effects are emerged in a direction from a slave media device 1140 to a master media device 1110 by selecting the slave media device 1140 to firstly output 'STAR'.

In this case, assuming that the user selects the reproduction gap between letters to be 1 second, the master media device adds 1 more second to the time information included in the media playback command message to be transmitted to the slave media device 1130 and adds 2 more seconds to the time information included in the media playback command message to be transmitted to the slave media device 1120. Then, the master media device starts outputting the word 3 seconds later than the reproduction time of the word at the slave media device 1140.

Exemplary embodiments of the present invention described with reference to FIGS. 9 to 11 may be applied together with exemplary embodiments of the present invention described with reference to FIGS. 1 to 8.

In the foregoing, media playback method according to an exemplary embodiment of the present invention was described with reference to FIGS. 1 to 11. A media playback apparatus according to an exemplary embodiment of the present invention will now be described with reference to related figures.

Figure 12:
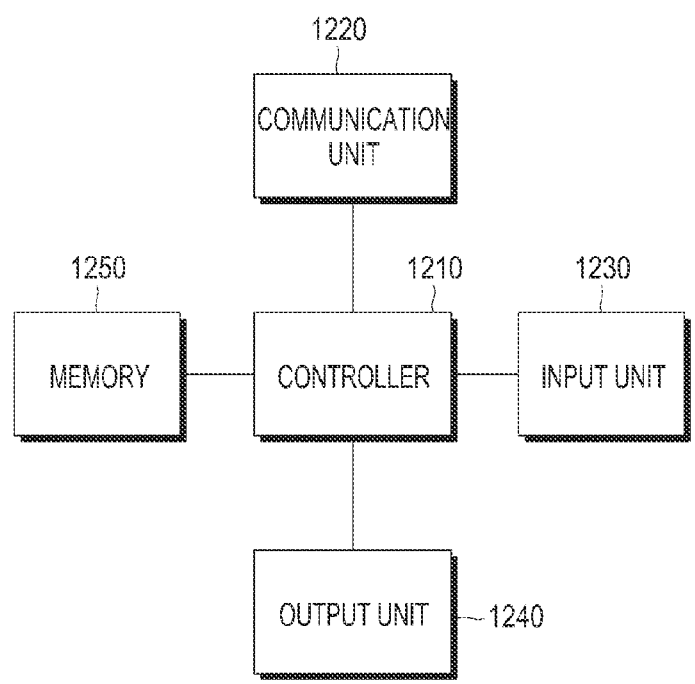
FIG. 12 is a block diagram of a media playback apparatus, according to an exemplary embodiment of the present invention.

FIG. 12 is a block diagram of the media playback apparatus, according to an exemplary embodiment of the present invention.

Referring to FIG. 12, the media playback apparatus includes a controller 1210, a communication unit 1220, an input unit 1230, an output unit 1240, and a memory 1250.

Operation of the controller 1210 will now be described in terms of the master media device.

The controller 1210 sends a message of requesting at least one slave media device selected by the user to establish a communication channel, and in return, upon reception of an acceptance message from the at least one slave media device, measures the communication delay time with the slave media device.

The controller 1210 repeats the procedure one or more times of transmission of a measurement message for measuring the communication delay time to the at least one slave media device and reception of the measurement reply message, and may determine the communication delay time based on at least one point in time at which the measurement message is transmitted and at least one point in time at which the measurement message is received.

According to an exemplary embodiment of the present invention, the measurement message may be a message requesting for the present time of the slave media device, and the measurement reply message for the measurement message may be a message indicating the present time of the slave media device at a time when the measurement message arrived at the slave media device. The controller 1210 may calculate a difference in time between the master media device and each of slave media devices based on the measured communication delay time, the present time of the master media device at a time when transmitting the measurement message and the present time of each of the slave media devices included in the reply message for the measurement message, and generate the media playback command message including a start time of the media playback at each of the slave media devices based on the measured communication delay time and the calculated difference in time.

The controller 1210 determines the media playback time based on the communication delay time with each of the slave media devices with which the master media device establishes the communication channel. Further, the controller 1210 generates a media playback command message for each of the slave media devices based on the determined media playback time and the communication delay time with each of the slave media devices, and sends out the media playback command message through the communication unit 1220. The controller 1210 then performs media playback at the corresponding media playback time.

The controller 1210 may determine the media playback time based on the longest communication delay time with one of the slave media devices. In this regard, the controller 1210 generates the media playback command message having time information that indicates a difference between the longest communication delay time with one of the slave media devices and the communication delay time with the corresponding slave media device, and transmits the media playback command message to the corresponding slave media device. Alternatively, after passage of the difference between the longest communication delay time with one of the slave media devices and the communication delay time with the corresponding slave media device, the controller 1210 generates the media playback command message and transmits the media playback command message to the corresponding slave media device. According to an exemplary embodiment of the present invention, as another alternative, after generating the media playback command message for each of the slave media devices, the controller 1210 waits for a time as much as the difference between the longest communication delay time with one of the slave media devices and the communication delay time with the corresponding slave media device and transmits the media playback command message to the corresponding slave media device.

The controller 1210 may transmit media to be played to each of the slave media devices before determining the media playback time. In this regard, the controller 1210 transmits a confirm message inquiring whether the media to be played is stored to each of the slave media devices, and analyzes a reply message in response to the confirm message received from each of the slave media devices and transmits the media to a slave media device that does not store the media. Thereafter, the controller 1210 may determine the media playback time based on times when receiving a media reception complete message indicating that the media reception has been completed from all of the media devices to which the media has been transmitted.

Furthermore, the controller 1210 may store communication delay times in the memory 1250, determine a media control time according to various control commands input by the user based on the stored communication delay time, generate a media control command message for each of the slave media devices taking into account the determined media control time, transmit the media control command message to each of the slave media devices, and perform media control at the determined media control time.

Furthermore, the controller 1210 may store the measured communication delay times and time differences with the slave media devices in the memory 1250, determine a media control time according to various control commands input by the user based on the stored communication delay time, generate a media control command message for each of the slave media devices taking into account the determined media control time and the stored time difference with the slave media device, transmit the media control command message to each of the slave media devices, and perform media control at the determined media control time.

The controller 1210 may allow the user to assign each of two sound channels that make up the media to each media device, and insert information about the assigned sound channel for each slave media device in the media playback command message.

The controller 1210 may also allow the user to select the number of split-screens into which an image frame of the media is divided and a media device to reproduce each split-screen, and insert information about the split-screen of the image frame to be played in the corresponding slave media device in the media playback command message to be transmitted the corresponding slave media device.

The controller 1210 may receive an input of information about a sequence in which to output the media and a time gap between media outputs, and determine the media playback time at each media device taking into account the information.

Operations of the controller 1210 will now be described in terms of the slave media device.

According to exemplary embodiments of the present invention, the controller 1210 determines a media playback time of the slave media device by analyzing the media playback command message received from the master media device through the communication unit 1220, and performs media playback at the media playback time. The controller 1210 may determine to playback the media immediately after receiving the media playback command message when the media playback command message does not include time information regarding media playback. If the media playback command message includes the time information regarding the media playback, the controller 1210 may determine the time that the time information indicates to be the media playback time, or may determine the time after passage of the time that the time information indicates to be the media playback time.

The controller 1210 may stop play back of the media according to an instruction of the user being input while playing back the media.

The communication unit 1220 performs communication with other media devices.

The input unit 1230 may include a keyboard, a touch-screen, or the like used to receive from the user different information for media control under control of the controller 1210.

The output unit 1240 may include a screen to display various images under control of the controller 1210. According to exemplary embodiments of the present invention, the screen may be a touchscreen.

The memory 1250 stores different information under control of the controller 1210.

Exemplary embodiments of the present invention have an advantage of playing back the same media in multiple media devices, synchronously.

The foregoing exemplary embodiments of the present invention may be implemented in any different methods. For example, the exemplary embodiments of the present invention may be implemented in hardware, software, or a combination thereof. Implemented in software, the exemplary embodiments may be implemented with instructions, executable by one or more processors with various operating systems or platforms. Additionally, the software may be written in any of different proper programming languages, and/or may be compiled into machine-executable assembly language codes or intermediate codes, which are executed on a framework or a virtual machine.

Furthermore, the exemplary embodiments of the present invention may be implemented on non-transitory processor-readable media (e.g., memories, floppy discs, hard discs, compact discs, optical discs, or magnetic tapes) having one or more programs embodied thereon for carrying out, when executed by one or more processors, the method of implementing exemplary embodiments of the present invention discussed above.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of playing media in a media device in sync with at least one of other media devices, the method comprising:
    determining communication delay times between the media device and each of the other media devices with which a communication channel is established and a longest communication delay time among the communication delay times with each of the other media devices;
    dividing a display screen of the image file into a split-screen according to a number of the other media devices;
    determining a time point after the longest communication delay time from a present time as a media playback time of an image file;
    determining which screen of the split-screen to be displayed in each of the media device and the other media devices by an external input;
    assigning at least two output sound channels of the media to the media device and each of the other media devices, respectively;
    generating a media playback command message, for each of the other media devices, including the determined media playback time, information used for at least one of playback control, sound control, output sound channel change and output the split-screen, a communication delay time with a corresponding media device, information related to a specific screen of the split-screen to be displayed in each of the other media devices and information about which output sound channel is assigned for each of the other media devices;
    transmitting the media playback command message to each of the other media devices; and
    displaying a first screen of the split-screen determined to be displayed in the media device while performing media playback at the determined media playback time,
    wherein the generating of the media playback command message comprises:
        calculating a time difference between the media device and each of the other media devices based on a measured communication delay time, a present time of the media device at a transmission time of a measurement message, and a present time of each of the other media devices included in a measurement reply message, and
        generating the media playback command message including a start time of media playback at each of the other media devices based on the communication delay times and the time difference,
    wherein the measurement message comprises a message requesting at least one of the other media devices for a present time of the at least one of the other media devices, and
    wherein the measurement reply message comprises a message indicating the present time of the at least one of the other media devices at a time when the measurement message arrived at the at least one of other media devices.

2. The method of claim 1, further comprising:
    performing a procedure one or more times, wherein the procedure comprises:
        transmitting the measurement message for measuring the communication delay times to at least one of the other media devices; and
        receiving the measurement reply message in response to the measurement message; and
    measuring the communication delay times based on at least one transmission time of the measurement message and at least one reception time of the measurement reply message.

3. The method of claim 1, further comprising:
    before determining the media playback time,
        transmitting a confirmation request message for confirming whether the media is stored to each of the other media devices;
        analyzing a confirmation reply message received from each of the other media devices in return for the confirmation request message;
        transmitting the media to at least one other media device that does not store the media; and
        receiving a media reception complete message indicating that media reception has been completed from the at least one of the other media devices to which the media was transmitted,
    wherein the determining of the media playback time comprises determining the media playback time based on a time when the media reception complete message is received from all of the other media devices to which the media was transmitted.

4. The method of claim 2, further comprising:
    storing the measured communication delay time;
    determining a media control time based on the measured communication delay time;
    generating a media control command message for each of the other media devices based on the determined media control time;
    transmitting the media control command message to each of the other media devices; and
    performing media control at the media control time.

5. The method of claim 2, further comprising:
    storing the measured communication delay times and the calculated time difference;
    determining a media control time based on the measured communication delay time;
    generating a media control command message for each of the other media devices based on the determined media control time and the stored time difference, and transmitting the media control command message to each of the other media devices; and performing media control at the media control time.

6. An apparatus for playing media in a media device in sync with at least one of other media devices, the apparatus comprising:
a touch screen;
a non-transitory memory;
a communication device for communicating with the other media devices; and
a processor configured to:
  determine communication delay times between the media device and each of the other media devices with which a communication channel is established and a longest communication delay time among the communication delay times with each of the other media devices,
  divide a display screen of the image file into a split-screen according to a number of the other media devices,
  determine a time point after the longest communication delay time from a present time as a media playback time of an image file,
  determine which screen of the split-screen to be displayed in each of the media device and the other media devices by an external input,
  assign at least two output sound channels of the media to the media device and each of the other media devices, respectively;
  generate a media playback command message for each of the other media devices, including the determined media playback time, information used for at least one of playback control, sound control, output sound channel change and output the split-screen, a communication delay time with a corresponding media device, information related to a specific screen of the split-screen to be displayed in each of the other media devices and information about which output sound channel is assigned for each of the other media devices,
  control the communication device to transmit the media playback command message through the communication device, and
  control the touch screen to display a first screen of the split-screen determined to be displayed in the media device while performing media playback at the media playback time,
wherein a measurement message comprises a message requesting the at least one of the other media devices for a present time of the at least one other selected media device,
wherein a measurement reply message comprises a message indicating the present time of the at least one of the other media devices at a time when the measurement message arrived at the at least one other selected media device, and
wherein the processor is further configured to:
  calculate a time difference between the media device and each of the other media devices based on a measured communication delay time, a present time of the media device at a transmission time of the measurement message, and a present time of each of the other media devices included in the measurement reply message, and
  generate the media playback command message including a start time of media playback at each of the other media devices based on the communication delay time and the time difference.

7. The apparatus of claim 6, wherein the processor is further configured to:
  control the communication device to transmit the measurement message for measuring the communication delay times to at least one of the other media devices, and
  receive the measurement reply message response to the measurement message, and to measure the communication delay time based on at least one transmission time of the measurement message and at least one reception time of the measurement reply message.

8. The apparatus of claim 6, wherein the processor is further configured to determine the media playback time based on a longest communication delay time among the communication delay times with the other media devices.

9. The apparatus of claim 8, wherein the processor is further configured to generate the media playback command message having time information that indicates a difference between the longest communication delay time and a corresponding communication delay time with each of the other media devices.

10. The apparatus of claim 6, wherein the processor is further configured to:
  control the communication device to transmit a confirmation request message for confirming whether the media is stored to each of the other media devices,
  analyze a confirmation reply message received from each of the other media devices in return for the confirmation request message,
  control the communication device to transmit the media to at least one other media device that does not store the media, before determining the media playback time, and
  determine the media playback time based on times when receiving a media reception complete message indicating that the media reception has been completed from all of the media devices to which the media was transmitted.

11. The apparatus of claim 7, wherein the processor is further configured to:
  control the non-transitory memory to store the measured communication delay time in the non-transitory memory,
  determine a media control time based on the measured communication delay time,
  generate a media control command message for each of the other media devices based on the determined media control time,
  control the communication device to transmit the media control command message to each of the other media devices, and
  perform media control at the media control time.

12. The apparatus of claim 7, wherein the processor is further configured to:
  control the non-transitory memory to store the measured communication delay time and the calculated time difference in the non-transitory memory,
  determine a media control time based on the measured communication delay time,
  generate a media control command message for each of the other media devices based on the determined media control time and the stored time difference,
  control the communication device to transmit the media control command message to each of the other media devices, and
  perform media control at the media control time.

* * * * *